United States Patent
Nakata et al.

(10) Patent No.: US 6,831,277 B1
(45) Date of Patent: Dec. 14, 2004

(54) METHOD FOR MEASURING DIMENSIONS AND ALIGNMENT OF THIN FILM MAGNETIC HEAD AND APPARATUS THEREFOR

(75) Inventors: Toshihiko Nakata, Hiratsuka (JP); Hideaki Sasazawa, Yokohama (JP); Kenji Furusawa, Hiratsuka (JP); Minako Morisato, Yokohama (JP); Hideo Yamakura, Yokohama (JP); Toshio Tamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/437,265

(22) Filed: Nov. 10, 1999

(30) Foreign Application Priority Data

Nov. 20, 1998 (JP) ............................................ 10-331297

(51) Int. Cl.$^7$ ............................................. G01B 11/00
(52) U.S. Cl. ..................... 250/372; 29/603.09
(58) Field of Search ...................... 250/372; 29/603.09

(56) References Cited

U.S. PATENT DOCUMENTS

| | | | |
|---|---|---|---|
| 4,511,942 A | * 4/1985 | Valstyn ....................... | 360/126 |
| 4,795,261 A | 1/1989 | Nakata et al. | |
| 5,471,084 A | * 11/1995 | Suzuki et al. ................ | 257/421 |
| 5,717,518 A | * 2/1998 | Shafer et al. ................ | 359/357 |
| 6,093,083 A | * 7/2000 | Lackey ........................ | 451/28 |
| 6,212,761 B1 | * 4/2001 | Yoshida et al. .......... | 29/603.09 |

* cited by examiner

Primary Examiner—Constantine Hannaher
Assistant Examiner—Shun Lee
(74) Attorney, Agent, or Firm—Antonelli, Terry, Stout & Kraus, LLP

(57) ABSTRACT

A method of measuring variation in dimensions and alignment error of thin film magnetic heads formed on a raw bar cut-off from a substrate is provided. Such method comprises illuminating a MR element and a resistance detector element which is formed for monitoring a lapping process, both of which are formed on the raw bar, with illuminating light whose wavelength is 300 nm or less; forming an image by imaging light reflected from the elements; and converting the image to an image signal through photoelectric conversion so as to detect variation in dimensions of the MR element and the resistance detector element formed on the raw bar, and alignment error between the MR element and the resistance detector element with a high degree of accuracy.

12 Claims, 12 Drawing Sheets

FIG. 14A
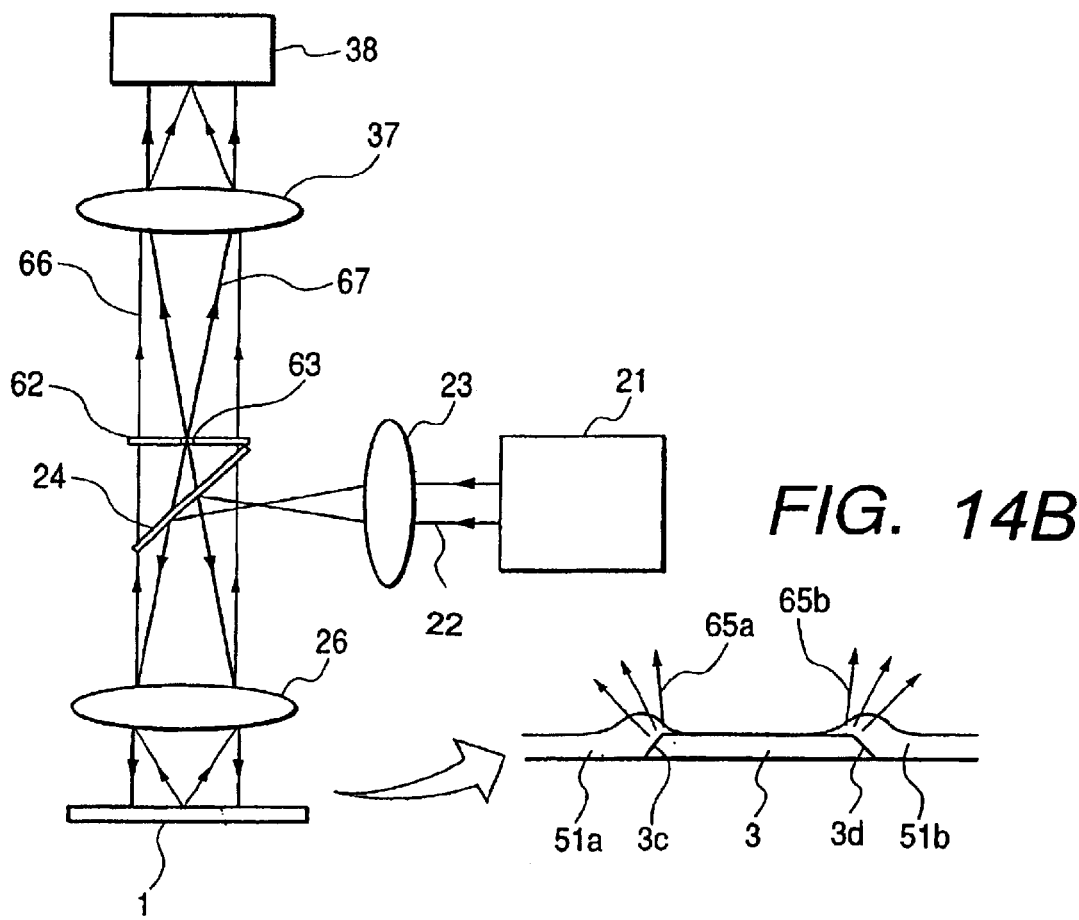
FIG. 14B
FIG. 15
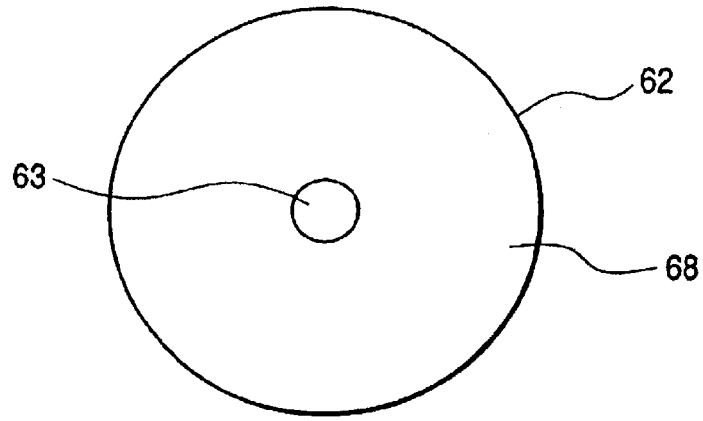

METHOD FOR MEASURING DIMENSIONS AND ALIGNMENT OF THIN FILM MAGNETIC HEAD AND APPARATUS THEREFOR

BACKGROUND OF THE INVENTION

The present invention relates to a method of measuring the dimensions and the alignment of a thin film magnetic head which comprises a magnetic induction type conversion element or a magnetoresistance effect element and which is formed on a substrate by a lamination process, and wherein the method employs a dimension and alignment measuring apparatus; and, more specifically, the invention relates to a method of measuring the dimensions and the alignment of a magnetoresistance effect element with a high degree of accuracy, and an apparatus for carrying out the method.

Lately, in magnetic disk apparatuses, there has been a steady trend toward reduction in the size and enlargement in the capacity thereof; and, currently, small size magnetic disk apparatuses equipped with a 3.5 inch or 2.5 inch disk have become mainstream items. In such small size magnetic disk apparatuses, since the rotation speed of the disk is relatively low, a decrease in the reproduced output has become a great concern in the use of a magnetic induction type head whose reproduced output is dependent on the disk speed.

In contrast to this, a magnetoresistance effect type head (hereinafter referred to as an MR head : MR=magnetoresistive) that employs a magnetoresistance effect element (hereinafter referred to as an MR element) whose resistance varies in accordance with a change in the magnetic field produces an output that is not dependent on the speed of the disk, and, hence, such a head can produce a high reproduced output even in the case of a small size magnetic disk apparatus.

Besides, since the MR heads can deliver a higher reproduced output compared to magnetic induction type magnetic heads, even when applied to narrower tracks, which is accompanied by a higher-density storage configuration, the MR heads are considered to be suitable to satisfy the trend toward miniaturization and mass storage in the magnetic media.

By the way, since an MR head detects a change in the resistance value caused by a change in the magnetic field, an MR head that uses an MR element exposed in a plane of a magnetic head slider opposed to the disk (hereinafter referred to as a floating surface) has a larger reproduction efficiency. In such an MR head, whose MR element is exposed in the floating plane thereof, part of the MR element is processed (lapped and polished, hereinafter referred to only as being lapped for simplicity) so as to expose the MR element in the floating plane in processing the floating plane. The dimension in a direction normal to the floating plane of the MR element is called the height of the MR element ($h_{MR}$), which is controlled so as to be within a prescribed value by controlling the amount of lapping in a lapping process.

In the MR head, the reproduced output changes depending on the height of the MR element, and, hence, a problem that the reproduced output varies or the reproduced output cannot reach a prescribed level may occur if the heights of the MR elements vary. Therefore, to prevent a variation in the reproduced output of the MR head and also to attain a high yield in the manufacture thereof, it is necessary to control the heights of the MR elements with a high degree of accuracy in the lapping process. For example, in the case of a surface recording density of 4 Gbit/inch$^2$, presumably the accuracy of the height of the MR element is required to be about ±0.2 gm; whereas, in the case of a surface recording density of 10 Gbit/inch$^2$, the accuracy is required to be about ±0.15 gm.

In order to control the heights of the MR elements with a high degree of accuracy in the lapping process, it is important to measure the heights of the MR elements accurately during the lapping. Presently, the design height of an MR element is about 0.5 to 3 gm. Since an induction type head for writing data is formed on the top of the MR element, it is difficult to directly measure the height of the MR element with optical means.

With this in view, Japanese Patent Laid-open Publication Nos. 63-34713 and 2-29913 propose a method wherein the height of the MR element (or the amount of lapping in the lapping process) is measured indirectly by a method wherein a measurement marker is formed in an element formation process and measurements are made based on the marker using optical means. However, this method can hardly be applied to in-process measurement during the lapping process.

Now, a method is proposed as a feasible method to perform in-process measurement wherein the resistance value of the MR element is measured and then the value is converted to the height of the MR element. This method can be implemented by two techniques: one is described in Japanese Patent Laid-Open Publication No. 5-46945, and proposes to directly measure the resistance value of the MR element itself and convert the value to the height of the MR element; and the other is described in Japanese Patent Laid-open-Publication No. 63-191570, and proposes to measure the resistance of an element (hereinafter referred to as resistance detector element (ELG element; ELG=Electric Lapping Guide)) that is formed separately from the MR element and to calculate the height of the MR element from the resistance value.

Of these methods, the former method for directly measuring the resistance of the MR element has the following problems.

(1) The MR element is formed using a thin film technology whose typical techniques are sputtering, exposure, ion-milling, etc. The dimensional accuracy attainable through this process is about ±0.2 μm. On the other hand, the width of the MR element (i.e., track width) is as narrow as 0.8 to 2.0 μm, and, therefore, a variation in the resistance value of the MR element occurs due to a variation in the track width.

(2) In forming an MR film by sputtering, there occurs a variation in its thickness depending on its position on a wafer, namely whether it is at a center part or an edge part of the wafer, and the variation in the thickness in the wafer becomes a factor which contributes to the variation in the resistance value of individual MR elements. Especially, in recent years, the film thickness of the MR element has become thinner, and so the unevenness of the film thickness tends to increase. As a result, the variation in the resistance value also increases. That is, a real MR element suffers from a variation in the resistance value due to a variation in the track width and an unevenness in the film thickness. This variation in the resistance value causes an error in measuring the height of the MR element, hence becoming one of the factors responsible for deterioration of the accuracy of the measurement.

In contrast to this, the latter method for performing in-process measurement by measuring the resistance value and converting the value to the height of the MR element has the following merits.

(1) In a resistance detector element, the track width can be made larger (10 to 500 gm) arbitrarily, and, therefore, its resistance value hardly varies at all, even when the track width varies by ±0.2 µm, for example. Therefore, the variation in the track width has only a little effect on the resistance value.

(2) In a resistance detector element, it is possible to cancel out the unevenness of the film thickness in calculating the height of the MR element from the resistance value of the resistance detector element by the use of a reference pattern element (reference resistance).

As described in the foregoing, the method of performing a measurement of the height of the MR element by the use of a resistance detector element enables in-process measurement of the height of the MR element with a high degree of accuracy, because the effect of both the variation in the track width and the unevenness of the film thickness can be reduced. However, this method involves the following problems.

Both the resistance detector element and the MR element are formed by a thin film process whose typical techniques are sputtering, exposure, ion-milling, etc. In an exposure process, however, when there is an unevenness in the resist film thickness and an illuminance unevenness, a variation in the exposure occurs, and, hence, a variation in dimension results. Further, in some cases, when there is image distortion in the exposure equipment, an alignment error in the element occurs. In the method using a resistance detector element, the real height of the MR element is not directly measured, and it is assumed as a major premise that the resistance detector element and the MR element are formed in conformity to design dimensions and design alignment.

Accordingly, if the dimensions of the resistance detector element and the MR element vary, as described above, or there occurs a misalignment in these elements, such variation and misalignment all give rise to measurement errors, and, finally, a variation in the height of the MR element occurs in the lapping process.

SUMMARY OF THE INVENTION

An object of the present invention is to provide a method of in-process measurement of the height of an MR element, wherein the resistance value of a resistance detector element is measured during the lapping process, and the measurement value is converted to the height of the MR element. It is a further object of the invention to provide a method of measuring both the variation in dimensions and the misalignment of the MR element and the resistance element, which become error factors, and an apparatus for carrying out the method. It is another object of the invention to provide a method of monitoring a MR element formation process by using the above-described method and apparatus, detecting a problem in the process, and modifying parameters of film deposition equipment and exposure equipment to eliminate the problem.

To achieve the above-described objects, the method of measuring the dimensions and alignment of a thin film magnetic head according to the present invention employs a magnetoresistance effect element and a resistance detector element for monitoring the lapping process, both of which are formed on a substrate and are illuminated with light emitted from a light source whose wavelength is 300 nm or less, preferably is 200 nm. An image is formed by imaging reflected light from the aforesaid elements, the image is converted to an image signal through photoconversion, and geometrical information of the above-described magnetoresistance effect element and the above-described resistance detector element for monitoring the lapping is detected from the aforesaid image signal.

Further, in accordance with the present invention, the above-described light is prescribed to be light having a wavelength of 248 nm, or of 266 nm, or of 213 nm.

Moreover, in accordance with the present invention, the above-described geometrical information includes the dimensions of the element or a measure of the alignment error of the element.

Furthermore, in accordance with the present invention, the above-described magnetoresistance effect element and the above-described resistance element for monitoring the lapping process have a structure wherein the elements are covered with end face protection films. Also, to achieve the above-described objects, the method for measuring the dimensions and alignment of a thin film magnetic head according to the invention employs a magnetoresistance effect element and a resistance detector element for monitoring the lapping process, both of which are formed on a substrate and are illuminated with light emitted from a light source whose wavelength is 300 nm or less, preferably is in the range of 200 nm. Reflected light from the elements is made to interfere with reference light, interference light thus formed (i.e. a combination of the diffracted light and the reference light) is imaged to form an image, this image is converted to an image signal through photoconversion, and geometrical information of the magnetoresistance effect element and the resistance detector element for monitoring the lapping is detected from this image signal.

Also, to achieve the above-described objects, the apparatus for measuring dimensions and alignment of the thin film magnetic head according to the invention comprises a light source; illuminating means for illuminating the magnetoresistance effect element and the resistance detector element for monitoring the lapping process, both of which are formed on a substrate, with light emitted from a light source whose wavelength is 300 nm or less, preferably in the vicinity of 200 nm; imaging means for imaging reflected light from this element; image pick up means for converting the image obtained by this imaging means to an image signal; and geometrical information detecting means for detecting geometrical information of the magnetoresistance effect element and the resistance detector element for monitoring the lapping.

Also, to achieve the above-described objects, the apparatus for measuring the dimensions and alignment of the thin film magnetic head according to the invention comprises a light source; illuminating means for illuminating the magnetoresistance effect element and the resistance detector element for monitoring the lapping, which are both formed on a substrate, with light whose wavelength is 300 nm or less, and preferably is in the vicinity of 200 nm; interfering means for making reflected light from the element interfere with reference light; imaging-means for imaging the interference light; image pick up means for converting an image obtained by this imaging means to an image signal; and geometrical information detecting means for detecting geometrical information of the magnetoresistance effect element and the resistance detector element for monitoring the lapping.

BRIEF DESCRIPTION OF THE DRAWINGS

FIG. 14(a) is a schematic diagram showing details of a measurement optical system according to the third embodiment of the present invention.

FIG. 14(b) is a side view of the wafer being processed.

FIG. 15 is a diagram showing a phase modulation element according to the third embodiment of the present invention.

DESCRIPTION OF THE PREFERRED EMBODIMENTS

Hereafter, various embodiments according to the present invention will be described with reference to the drawings.

First, prior to description of the embodiments according to the present invention, sources that cause a variation in the dimensions of the MR element during the lapping process will be described.

Figure 1:
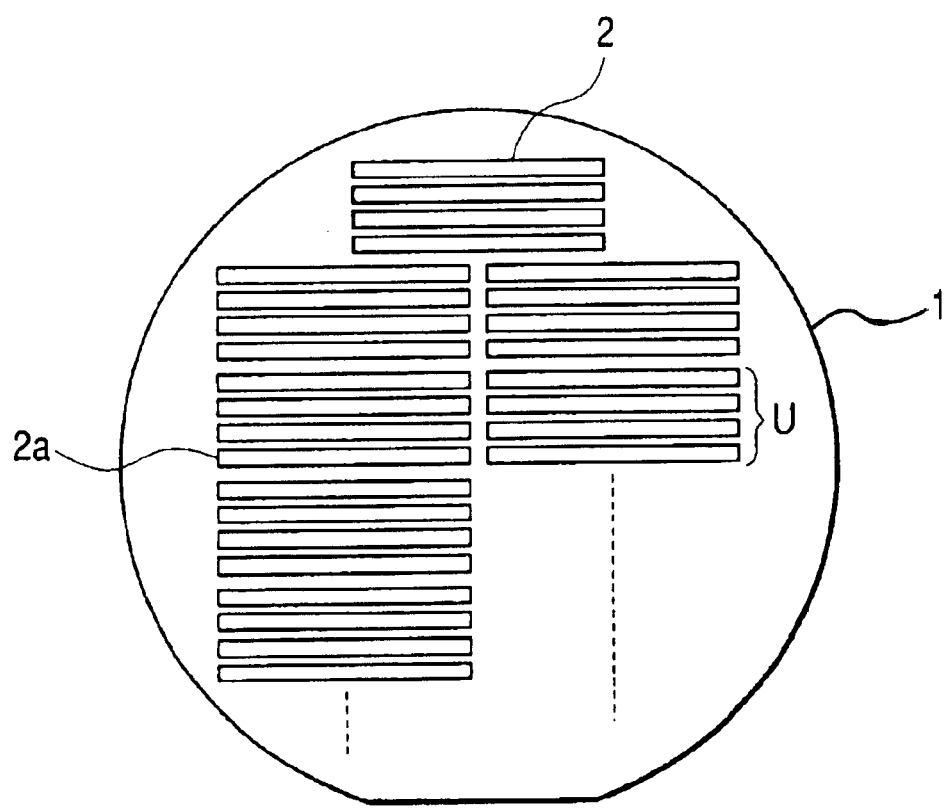
FIG. 1 is a diagram showing the formation of a row of bars on a wafer.
Figure 2A:
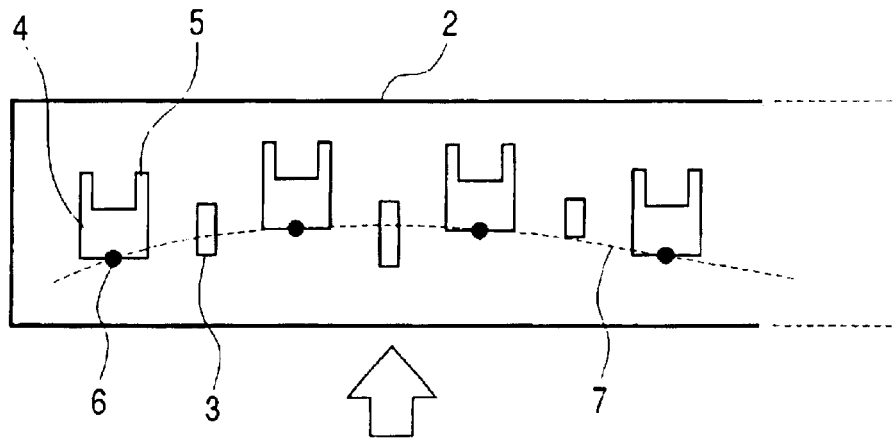
FIGS. 2(a) to 2(c) are diagrams showing a formation of the MR elements and the resistance detector elements on the row bar, as well as a lapping process thereof.
Figure 2B:
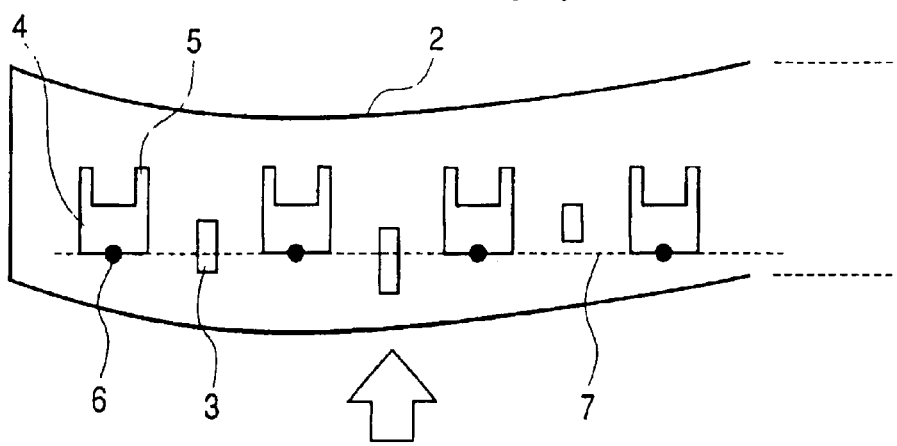
Figure 2C:
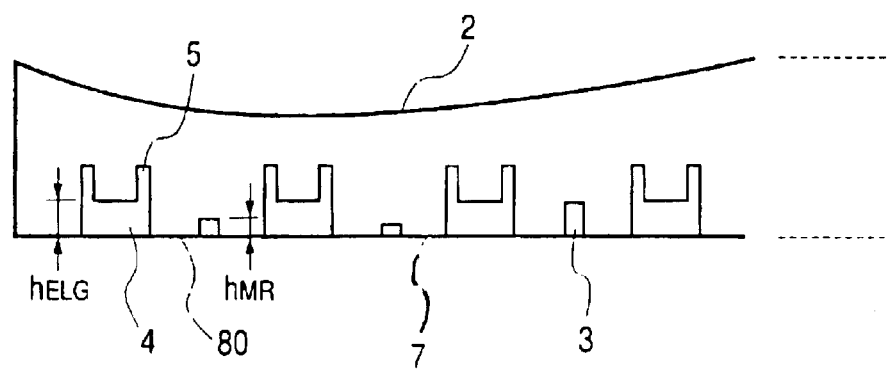

FIG. 1 is a view showing the process of forming the MR elements and the resistance detector elements and FIGS. 2(a) to 2(c) are views showing the lapping process applied to these elements. As shown in FIG. 2(a), a plurality of MR elements 3 and a plurality of resistance detector elements 4, which are located on either side of each MR element so that the MR elements are interposed therebetween, are formed in a band by a thin film process whose typical techniques are sputtering, exposure, ion-milling, etc. A plurality of the elements thus formed are separated from a wafer 1, being cut off in a band. This band is called a row bar 2. Within one row bar 2, for example, 30 pieces of MR elements 3 and 31 pieces of resistance detector elements 4 are arranged in a single row. In the example shown in FIG. 1, there are groups of four row bars 2, each group comprising one unit U, and each of the elements are formed by gang exposure (exposed as a group).

As shown in FIG. 2(a), by lapping a cut-off row bar 2 from the direction of the arrow indicated in the figure, 30 pieces of MR elements 3 are gang lapped so that the MR elements 3 are exposed in the floating plane 80 and all MR elements 3 are controlled to have the height hMR of a prescribed dimension. The floating plane 80 is processed to a prescribed shape with a prescribed roughness.

Here, since the reproduced output varies depending on the height $h_{MR}$, of the MR element, if the heights of the MR elements vary, there occurs a problem in that the reproduced output varies or a prescribed reproduced output cannot be attained, with a result that the MR element becomes defective. Therefore, in order to suppress the variation in reproduced output of the MR element and also to attain a high yield, it is necessary to measure the height of the MR element $h_{MR}$ during the lapping process and control the amount of lapping with a high degree of accuracy for all MR elements.

In order to implement this requirement, use is made of resistance detector elements (ELG) 4 that are formed in the vicinity of the MR elements 3 by an identical process. That is, as seen in FIG. 2(a), current is supplied from an electrode 5 of each resistance detector element 4, the change of the resistance value by lapping is measured for each resistance detector element, the height of the MR element hMR is calculated from the resistance value, and then the row bar 2 is bent. The lapping weight is controlled, as is shown in FIG. 2(b), so that the resistance values, namely, the heights of the MR elements $h_{MR}$ become uniform, and, hence, the alignment curve 7 defined by each position 6 of each resistance detector element 4 becomes a straight line.

The major premise underlying this method is that dimensional error and alignment error among the MR elements 3, dimensional error and alignment error among the resistance detector elements 4, and dimensional error and alignment error among both the MR elements 3 and the resistance detector elements 4 are all within about one tenth of a target dimensional accuracy (for example ±0.2–0.15μm), namely within about 20 to 15 nm.

The resistance detector elements 4 and the MR elements 3 are formed by an identical process, including techniques such as sputtering, exposure, ion-milling, etc. using an identical exposure mask. In case, for example, image distortion and/or illuminance unevenness occur in the exposure equipment or unevenness occurs in the resist coating etc. in the exposure process, the MR elements 3 become out of alignment relative to the alignment curve 7 defined by the resistance detector elements 4, as shown in FIG. 2(a), or dimensional error of the element height among the MR elements 3 or the resistance detector elements 4 will occur as shown in the same figure.

If lapping is performed in this situation so that the resistance values of resistance detector elements 4 become uniform, as is shown in FIG. 2(b), by bending the row bar and adjusting the lapping weight (so that the alignment curve 7 becomes a straight line), the heights of the MR elements 3 $h_{MR}$ will vary largely after lapping, as is shown in FIG. 2(c).

In view of this, the present invention intends to monitor the MR element formation process, detect a nonconformity in its early stage, and modify the process parameters by directly measuring the variation in dimensions of the MR elements and that of the resistance detector elements, which are error factors in the above-described lapping method, and alignment error of both elements just after the MR elements 3 and the resistance detector elements 4 are formed on the wafer 1. Hereinafter, embodiments according to the present invention will be described in detail with reference to FIG. 3 to FIG. 16.

A first embodiment according to the present invention will be described with reference to FIG. 3 to FIG. 11.

Figure 5:
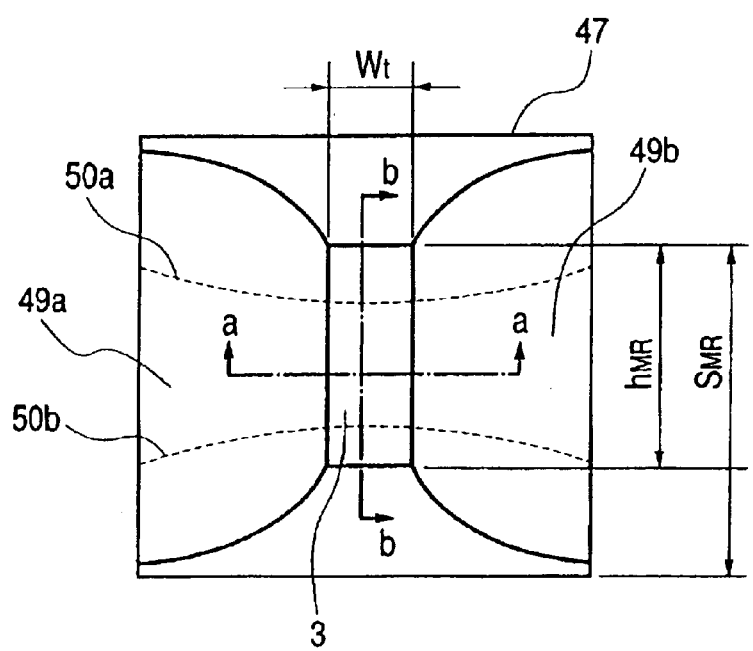
FIG. 5 is a top view showing the MR element to be measured and its electrode part.
Figure 6A:
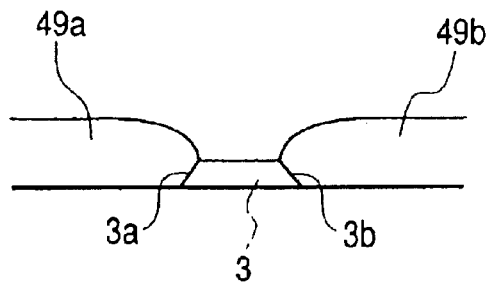
FIGS. 6(a) and 6(b) are side cross-sectional views of the MR element, as seen along line a—a and line b—b, respectively, in FIG. 5.
Figure 6B:
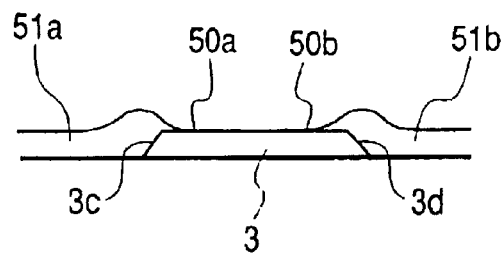

FIG. 5 is a view showing the MR element 3 to be measured and electrodes 49a and 49b located at both sides of the MR elements 3. FIG. 6(a) is a view showing a cross section taken along line a—a in FIG. 5; FIG. 6(b) is a view showing a cross section taken along line b—b in FIG. 5. Further, FIG. 7 is a view showing the resistance detector element 4, which is another component to be measured, and its electrode part 5.

When the surface recording density exceeds 10 Gbit/inch$^2$, resulting in a narrowing of the track width, the track width $W_t$ of the MR element 3 shown in FIG. 5 decreases to 0.5 μm or less, and it is expected that the precision of the element height hMR is required to be about ±0.15 μm.

Figure 7:
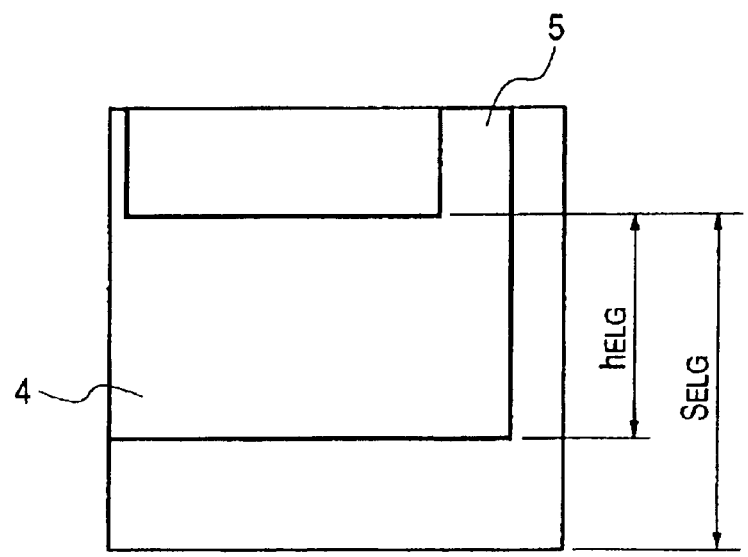
FIG. 7 is a diagram showing the resistance detector element to be measured and its electrode part.

Based on a principle of the above-described lapping method, in order to ensure this accuracy, it is necessary to control the accuracy of the height $h_{MR}$, the track width $W_t$ of the MR element in FIG. 5, the height $H_{ELG}$ of the resistance detector element 4, as seen in FIG. 7, and also alignment error among the MR elements, the alignment error among the resistance detector elements, and relative alignment error between both elements to be within ±0.15 μm or so. Therefore, the measurement accuracy that is required of the present invention is one which enables measurement of the variation in dimensions and alignment error within this value, ±0.15 μm or so.

Hereupon, in case normal visible light, for example light of a wavelength of 0.5 μm or so, is employed, provided that the numerical aperture (NA) of an optical system is 0.9, the theoretical resolution is calculated to be approximately 0.34 μm (i.e. 0.61 H wavelength/NA), and, hence, the above-described track width $W_t$=0.5 μm reaches almost the resolution limit. It is extremely difficult to measure, with a high degree of accuracy, the height of the MR element hMR and the height of the resistance detector element $h_{ELG}$, which have a variation of ±0.15 μm, and, needless to say, it is also difficult to measure the track width Wt accurately, from images whose feature sizes are in the vicinity of such resolution limit. Measuring the variation in dimensions and an alignment error of ±0.15 μm requires almost the same resolution in measurement.

By the way, as shown in FIG. 6(a), the end faces 3a and 3b of the MR element 3 as seen in a direction of the electrodes are covered with electrodes 49a and 49b, providing a construction wherein the end faces 3a and 3b are not exposed to the atmospheric air. On the other hand, as shown in FIG. 6(b), the end faces 3c and 3d of the MR element in a direction of the height $h_{MR}$ are generally covered with transparent ceramic thin films 51a and 51b having a thickness of tens of manometers which serve as end face protection films, because otherwise the end faces 3c and 3d in situ are exposed to the atmospheric air and are likely to suffer corrosion.

In FIG. 5, broken lines 50a and 50b show boundaries of these transparent end face protection films. If, for example, a SEM (Scanning Electron Microscope) or an AFM (Atomic Force Microscope) are used to obtain the above-described resolution of 0.15 μm or so, the detected signal obtainable catches only the surface profile of the end face protection film and cannot catch the underlying end faces 3c and 3d.

Figure 3:
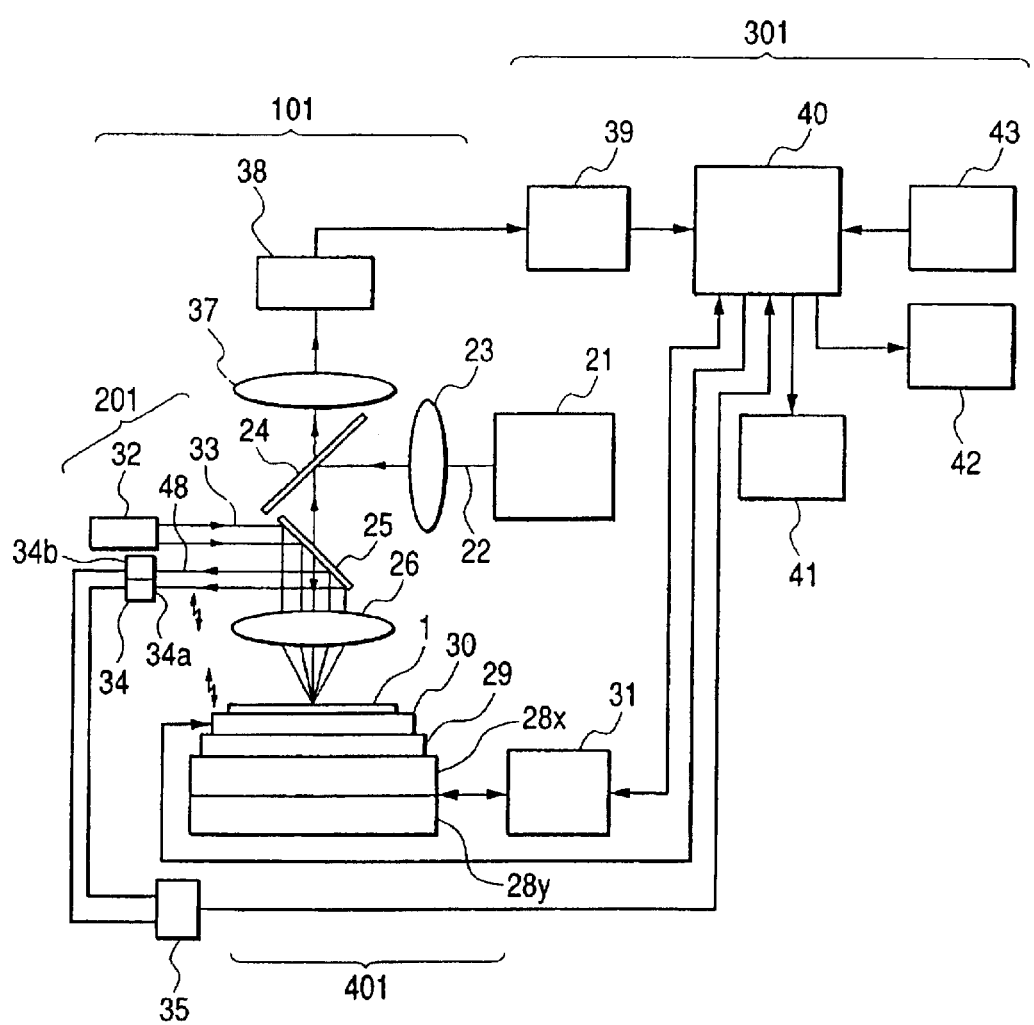
FIG. 3 is a block diagram showing a constitution of a dimension/alignment measuring apparatus for MR and ELG (an apparatus for measuring dimensions and alignment of the MR element and the resistance detector element) according to a first embodiment of the present invention.

In view of such a restriction given by the target to be measured, the present invention has been created. FIG. 3 is a diagram showing a dimension and alignment measurement apparatus for the MR elements and resistance detector elements according to the present invention (hereinafter simply called a dimension/alignment measurement apparatus for MR and ELG).

This apparatus is composed of a measurement optical system 101, an automatic focusing system 201 an image signal processing and controlling system 301, and a stage system 401.

A major feature of this apparatus is that DUV (Deep Ultraviolet) light having a wavelength of 248 nm and a DUV matching objective lens with a NA of 0.9 are employed to detect an element pattern for the purpose of implementing image measurement through the medium of the end face protection films described above and enabling measurement of the variation in dimensions and alignment error of ±0.15 μm or so. In this case, the theoretical resolution becomes 0.17 μm, and the variation in dimensions of the height of the MR element $h_{MR}$, and that of the resistance detector element $H_{ELG}$, both of which are ±0.15 μm or so, as well as the above described track width $W_t$ of 0.5 μm or so, can be measured and measurement of alignment error of the MR elements and the resistance detector elements can also be performed.

The stage system 401 is composed of high-precision X-stage 28x and Y-stage 28y whose straightness is 10 nm or so in the range of the length of a row bar, for example, 50 mm, a θ stage 29, and a high-precision Z-stage 30 whose straightness is 10 nm or so in the range of its stroke of 50 μm. A wafer 1 is mounted on a vacuum chuck (not shown in the figure) on the Z-stage 30. After a row bar is mounted, the θ stage 29 is rotationally adjusted so that the direction of the row bar (being parallel to the plane of the figure) is parallel to a scanning direction of the X-stage 28x (being parallel to the plane of the figure).

In the measurement optical system 101, an element area on the wafer 1 is epi-illuminated with DUV light 22 having a wavelength of 243 nm emitted from the DUV light source 21 through a DUV matching relay lens 23 and a DUV matching objective lens 26 with a NA of 0.9. By the way, a beam splitter 24 is used for separating illumination light and detected light, and a dichroic mirror 25 is used for separating the DUV light 22 and laser light 33 having a wavelength of 750 nm for automatic focusing. Reflected light from the element area on the wafer 1 is imaged onto a CCD solid image pickup element 38 through the DUV matching objective lens 26 and DUV imaging lens 37. The pixel size of the CCD solid image pickup element 38 is chosen to be about 20 nm on the wafer, considering that measurement of dimensions and alignment are to be performed with the accuracy of ±0.15 μm or so. In the image signal processing and controlling system 301, an image signal from the CCD solid image pickup element 38 is converted to a digital signal with an AD converter 39 and is then fed into a computer 40. The computer 40 controls the X-stage 28x and the Y-stage 28y in a step-and-repeat scanning manner through a stage driver 31 based on the design alignment data of the MR element and the resistance detector element which are stored in a memory 43 beforehand. Along the row bar (area of the row bar on the wafer 1) as shown in FIG. 2(a), the computer 40 repeats the cycle: translating the X-stage 28x→halting→picking up an image of the MR element→translating→halting picking up an image of the resistance detector element→translating→halting→$^{xxxxx}$. When the process of picking up the images is completed for all elements within one row bar, the computer 40 makes the Y-stage 28y move to a position of another row bar and makes the X-stage 28x translate to perform a measurement and repeats it.

The depth of focus for the measurement optical system 101 is calculated to be ±0.15 μm based on the wavelength of 248 nm and the NA of 0.9 of the DUV matching objective lens 26, and, therefore, it is not essential to perform high-precision focusing in picking up images.

In view of this, the automatic focusing system 201 performs this focusing in the present embodiment. A collimated light beam 33 having a wavelength of 780 nm emitted from a semiconductor laser 32 is reflected by the dichroic mirror 25 and is made to enter a peripheral portion of a pupil of the DUV matching objective lens 26, so as to illuminate the wafer 1 obliquely from above. The reflected light enters the objective lens 26 obliquely, being transformed into a collimated light beam 48, and enters a two-division photodiode sensor 34.

The two-division photodiode sensor 34 comprises two photodetector parts 34a and 34b, whose output signals from both photodetector parts 34a and 34b are fed into a difference circuit 35, and a differential signal from the difference circuit 35 is sent to the computer 40. When an element pattern to be measured on the wafer 1 is in an in-focus condition to the CCD solid image pickup element 38, the position of the sensor 34 is fine-tuned beforehand so that this differential signal is set to be zero.

As shown in FIG. 3, when the stage height or the height of an element pattern to be measured varies, the position of the reflected light beam 48 from the wafer 1 changes, which causes the output from the difference circuit 35 to increase or decrease. The Z-stage 30 is fine-tuned in response to a control signal from the computer 40, so that this differential output is constantly maintained to be zero, and, thereby, an in-focus condition is held.

Figure 4:
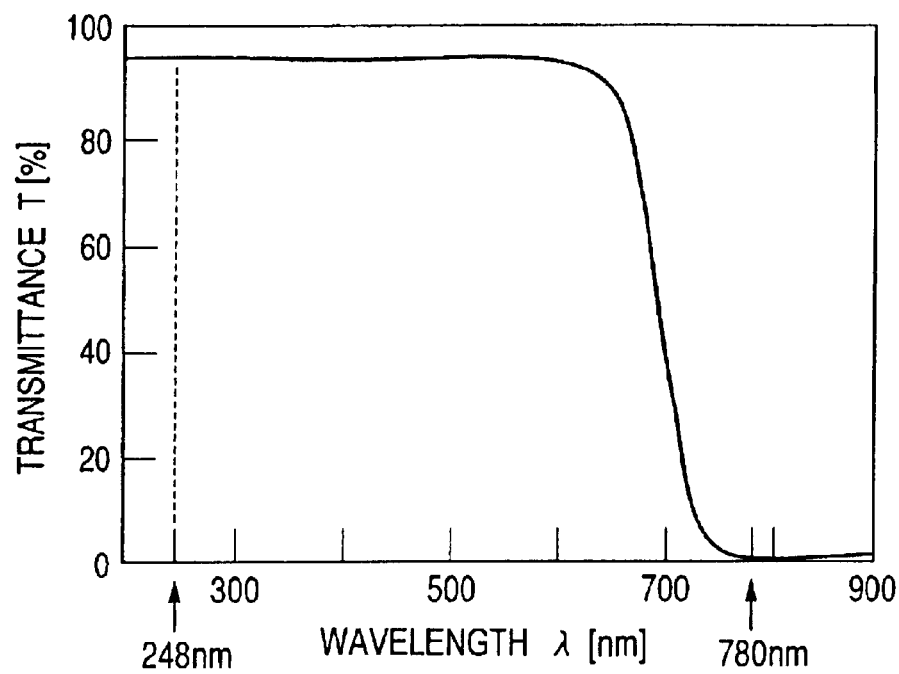
FIG. 4 is a graph showing a characteristic of spectral transmittance of a dichroic mirror.

FIG. 4 is a graph showing a characteristic of spectral transmittance of a dichroic mirror 25. The dichroic mirror 25 reflects 90% or more of the DUV light having a wavelength of 248 nm used for image measurement and also reflects 95% or so of the laser light used for automatic focusing. Further, this measurement optical system 101 is constructed using a double-telecentic optical system, which generates a smaller magnification error in response to a small amount of shift in a focal position. By the way, an automatic focusing system may be a system which calculates the contrast of a pattern, the detected image itself, and fine-tunes the Z-stage 30 so that the contrast is maximized.

Figure 8A:
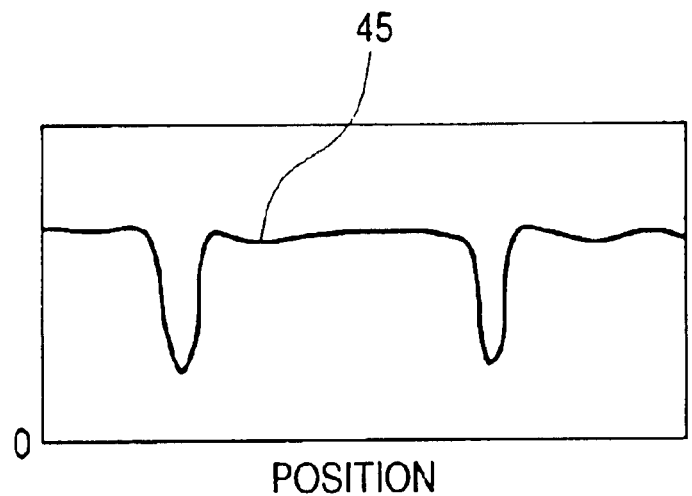
FIGS. 8(a) and 8(b) are diagrams showing an image signal along a height direction of the MR element and its differential waveform.
Figure 8B:
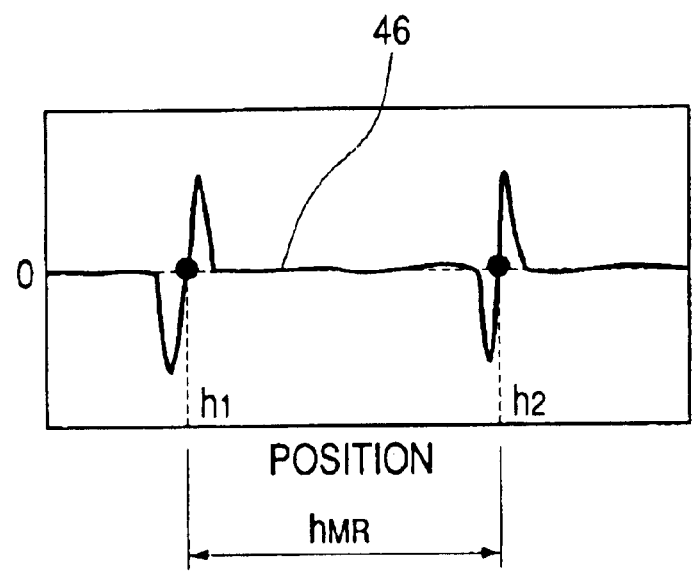

The computer 40 performs measurement of each dimension from a detected image while translating the stage to a neighboring element after picking up the element image. FIG. 5 is a view showing the detected image 47 of the MR element 3. An image signal 45 in the b—b direction of the part, namely, in the direction of the element height $h_{MR}$, is shown in FIG. 8(a). If differentiation is performed on this signal, a differential waveform 46, is shown in FIG. 8(b), can be obtained. The height of the MR element $h_{MR}$ can be obtained by finding zero crossing positions $h_1$ and $h_2$ of the differential waveform 46 and calculating $|h_1-h_2|$. The track width $W_t$ in FIG. 5 and the height of the resistance detector element $H_{ELG}$ in FIG. 7 can be obtained similarly.

Figure 9:
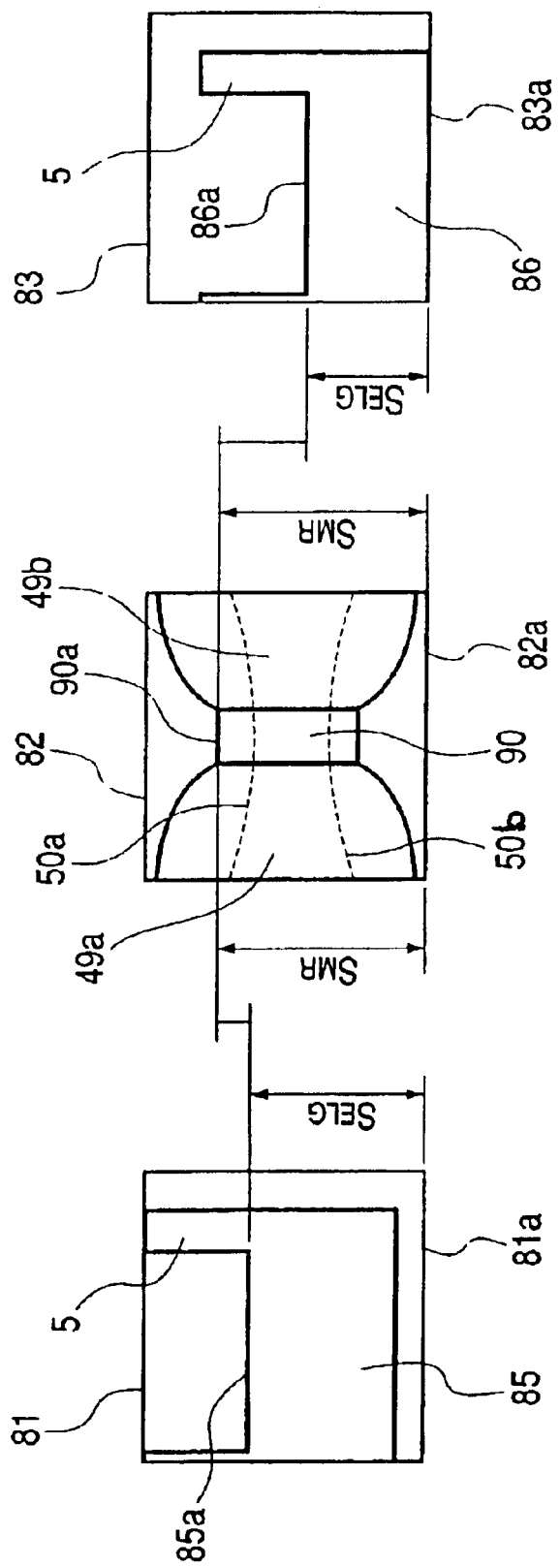
FIG. 9 is a diagram showing an example of measurement of relative alignment error of the MR element and that of the resistance detector element.

FIG. 9 is a diagram showing an example of measurement of relative alignment error of the MR elements and the resistance detector elements on the basis of the straightness of the X-stage 28x, namely using its locus in a direction of scanning as a reference. From a detected image 81 on the left side in the figure, the distance $S_{ELG}$ from a lower edge part 81a of the image 81 to an upper edge part 85a of the resistance detector element 85 is measured, and then the X-stage 28x is translated and an image 82 of the MR element 90 is detected. Similarly, the distance $S_{MR}$ from a lower edge part 82a of the image 82 to an upper part 90a of the MR element 90 is measured, and then the X-stage 28x is again translated and an image 83 of the resistance detector element 86 is detected. Similarly, the distance SELG from a lower edge part 83a of the image 83 to an upper part 86a of the resistance detector element 86 is measured.

The computer 40 repeats the above-described measurement for the MR elements of one row bar. That is, in this measurement, the lower edge of the detected image is used as a reference and the distance from the lower edge to an upper edge of each element is taken as an alignment measured value.

Figure 10:
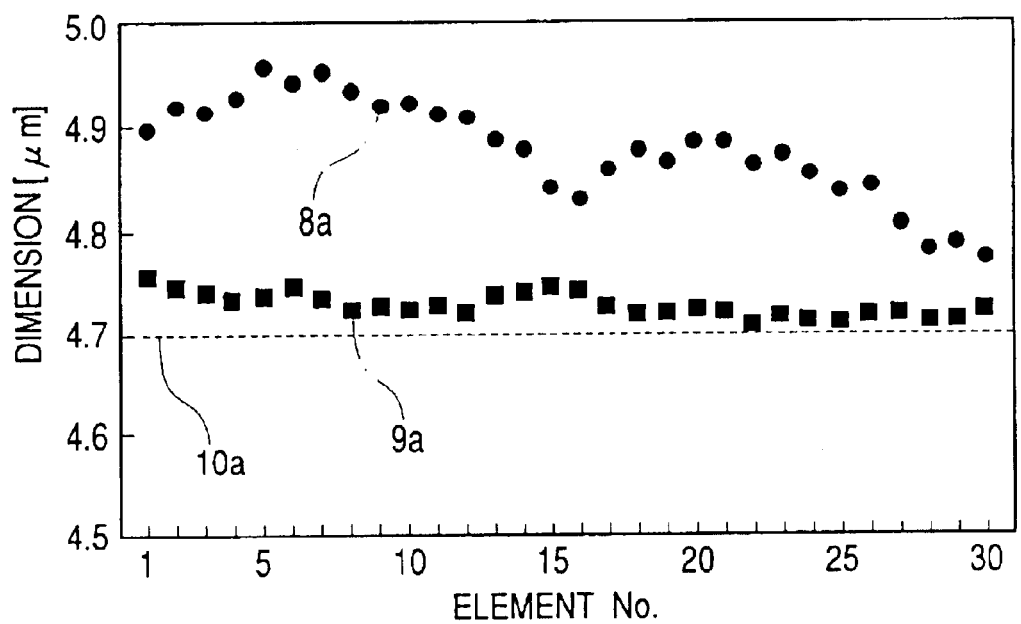
FIG. 10 is a diagram showing results of measurement of the height of the MR element and that of the resistance detector element for a row bar on a wafer.

FIG. 10 is a diagram showing results of measurement of the heights of the MR elements hMR and those of the resistance detector elements $h_{ELG}$ for the row bar 2a on the wafer 1 shown in FIG. 1. Solid circles 8a represent the heights of the MR elements $h_{MR}$ and solid squares 9a represent the heights of the resistance detector elements $h_{ELG}$. A broken line 10a represents a design value of 4.7 μm and the figure indicates that measured values for each of the elements exceed the design value, respectively. Further, two large wave undulations for the heights of the MR elements hMR are considered to be caused by illuminance unevenness in the exposure equipment.

Figure 11:
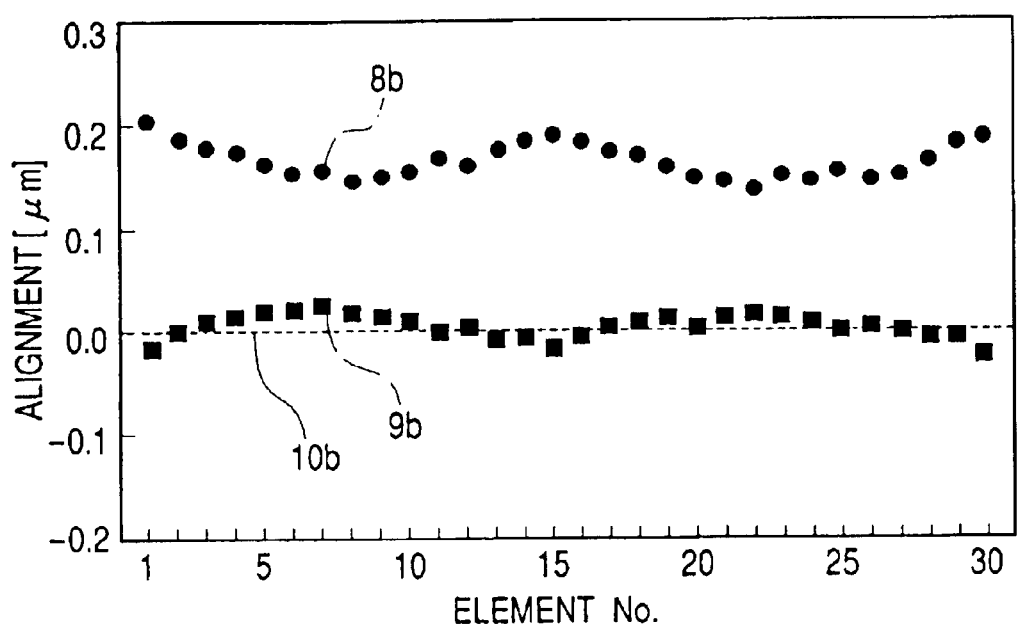
FIG. 11 is a diagram showing results of measurement of alignment of the MR elements and that of the resistance detector elements.

FIG. 11 is a diagram showing results of measurement of alignment of the MR elements and the resistance detector elements for the row bar 2a on the wafer 1 shown in FIG. 3. Solid circles 8b represent the alignment of the MR elements and solid squares 9b represent the alignment of the resistance detector elements. In the figure, an average value of the above-described alignment measured values of the resistance detector elements is set to be zero, as shown by a broken line 10b, and the relative values of the alignment measured values to the average value are plotted to show the alignment of the MR elements. Wave undulations recognized for both elements are considered to be caused by illuminance unevenness and image distortion in the exposure equipment.

In the present embodiment, measurement results shown in FIG. 10 and FIG. 11, the variation in dimensions of the elements in an exposure area or over the whole wafer, or two dimensional distribution of alignment error can be displayed on a display 41. When the variation in dimensions or alignment error exceeds a prescribed value, the following measures can be taken: a row bar or wafer of concern is stopped during the processing so as not to flow into the next process; and maintenance instructions are issued for the exposure equipment, a resist coater, film deposition equipment, or the like, which are all used for element formation, in order to detect a nonconformity at its early stage, to modify process parameters to reduce illuminance unevenness, or to fine-tune the film thickness. By taking such measures, it is possible to apply the measurement results obtained in managing and controlling the process. Also, measured data is stored in a memory 42, and therefore this data can also be utilized to monitor the variation in dimensions and the variation in alignment error over a long period.

Hereupon, in the present embodiment, a combination of a mercury-xenon lamp and an interference filter with a center transmission wavelength of 248 nm is chosen to be the DUV light source. Alternatively, a fourth harmonic wave of a semiconductor laser pumped YAG laser, namely 266 nm light, or its fifth harmonic, namely 213 nm light, or its third harmonic, namely 355 nm light, may be used. Alternatively, an ArF excimer laser (wavelength 193 nm) and a KrF excimer laser (wavelength 248 nm) may also be used. Also, the I line of a mercury lamp (wavelength 365 nm) may be used.

Further, in the present embodiment, a scanning locus of the X stage 28$x$ is persistently chosen to be a basis for measurement of element alignment. Alternatively, to further improve the accuracy of the measurement, it is also possible to constantly monitor the displacement of the stage with a laser length measuring machine, a capacitive sensor, etc., which is temperature controlled, and correct a reference position of detected images by that amount of displacement.

Further, in case a laser length measuring machine is used, relative displacement between the measurement optical system 101 and the wafer 1 can be monitored constantly by mounting both a measurement mirror on a vacuum chuck and a reference mirror on the objective lens 26, and, hence, higher-precision measurement of alignment can be implemented. Furthermore, it is also possible to measure the straightness profile of the X-stage 28$x$ beforehand and, based on the measured data, correct the measured images.

As described in the foregoing, measurement of various dimensions of the MR element, whose track width $W_t$ is 0.5 μm or less, and the resistance detector elements, as well as alignment error among these elements, can be performed even when the MR elements are covered with end face protection films, and, consequently, the condition of the element formation process can be in-process monitored. By virtue of this, it is possible to find problems in the process at an early stage, and modify the process parameters, so that the number of defective products is reduced and the yield is improved. In addition, in controlling the lapping weight in the lapping process, feedforward control lapping can also be realized, wherein the amount of weight is corrected based on measured data indicating dimensions and alignment.

Figure 12:
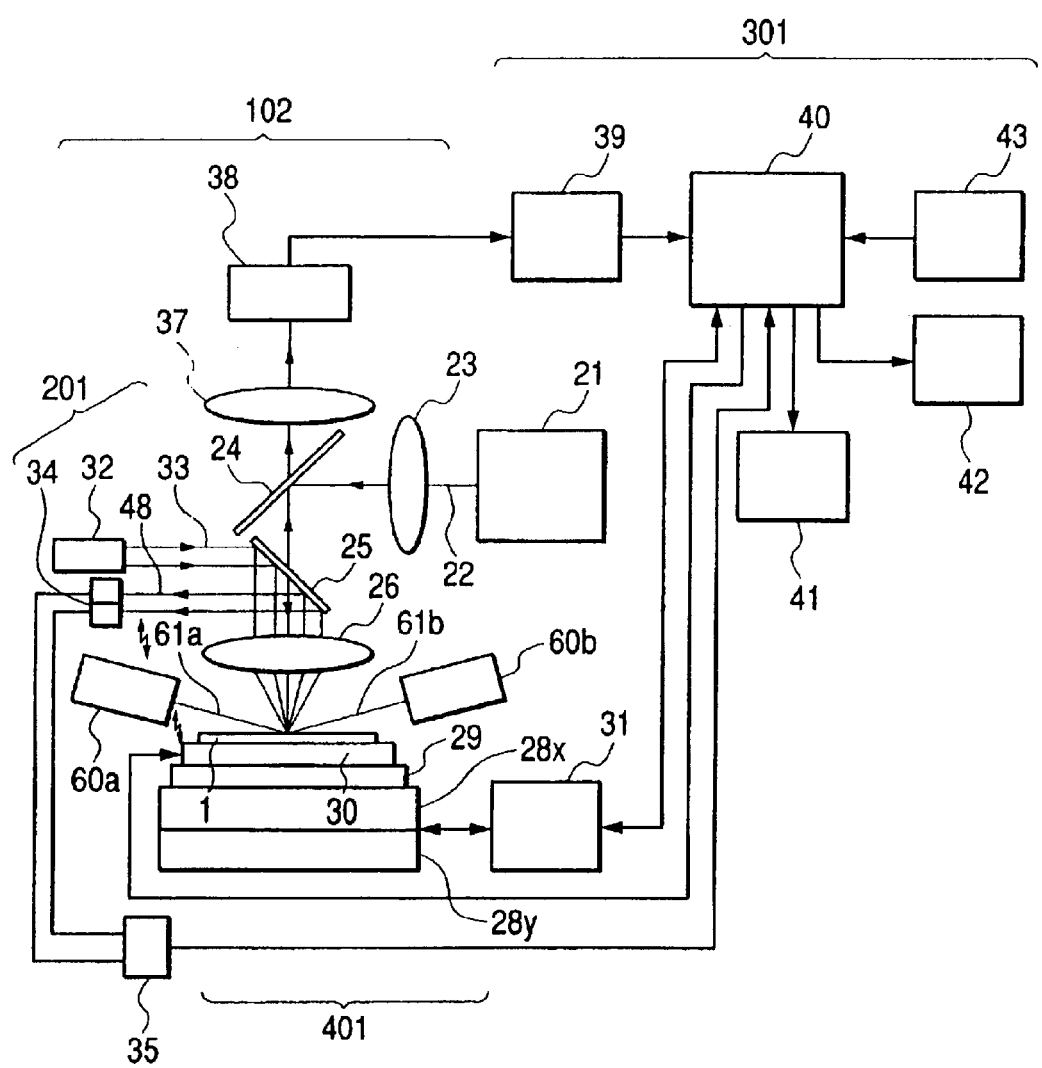
FIG. 12 is a schematic block diagram showing a dimensionlalignment measuring apparatus for MR and ELG according to a second embodiment of the present invention.

Next, a second embodiment according to the present invention will be described with reference to FIG. 12. FIG. 12 is a schematic block diagram showing a dimension/alignment measuring apparatus for MR and ELG according to a second embodiment of the present invention.

This apparatus is composed of a measurement optical system 102, the automatic focusing system 201, the image signal processing and controlling system 301, and the stage system 401. The main difference of the present embodiment from the first embodiment is that the measurement optical system 102 is constructed by mounting oblique illumination systems 60$a$ and 60$b$ for detecting an image (parallel to a plane of the figure) and oblique illumination systems for detecting an image (normal to the plane, not shown in the figure) on the measurement optical system 101 of the first embodiment. Constructions and features of other components, that is, the automatic focusing system 201, the image processing and controlling system 301, and the stage system 401, are the same as in the first embodiment and, therefore, a description of these components will be omitted.

Each of the oblique illumination systems 60$a$, 60$b$, is composed of a fourth harmonic generator of a semiconductor laser-pumped YAG laser and a beam forming optical system. The oblique illumination systems 60$a$, 60$b$, emit light beams 61$a$, 61$b$ having a wavelength of 266 nm, (parallel to the plane of the figure) and light beams (normal to the plane, not shown in the figure), so as to illuminate the element area on the wafer 1 obliquely from above in four directions. For example, the end faces 3$c$ and 3$d$ in an element height direction of the MR element on the wafer 1 shown in FIG. 6($b$) are illuminated obliquely from above by the oblique illumination systems 60$c$ and 60$d$, and scattered light from the stepped regions is imaged onto the CCD solid image pickup element 38 through the DUV matching objective lens 26 and the DUV imaging lens 37. The subsequent processing is the same as in the first embodiment.

According to the present embodiment, not only is it possible to attain the same effects as those of the first embodiment, but also an effect can be produced wherein high-precision measurement of dimensions and the alignment of the MR elements can be performed by detecting the scattered light from the stepped regions which are illuminated obliquely from above, even when the MR elements and the resistance detector elements come to have a pattern step whose height is of the order of 10 nm as a result of a trend toward reduction in thickness regarding these elements. By the way, the epi-illumination system is still utilized in detecting an alignment pattern for rotation adjustment of a wafer and in performing measurement of an element pattern having a relatively large step. Further, in the present embodiment, a scanning locus of the X stage 28$x$ is persistently chosen to be a basis for measurement of element alignment. Alternatively, to further improve the accuracy of the measurement, it is also possible to monitor the displacement of the stage with a laser length measuring machine, which is temperature controlled, and to correct a reference position of the detected images by that amount of displacement.

Figure 13:
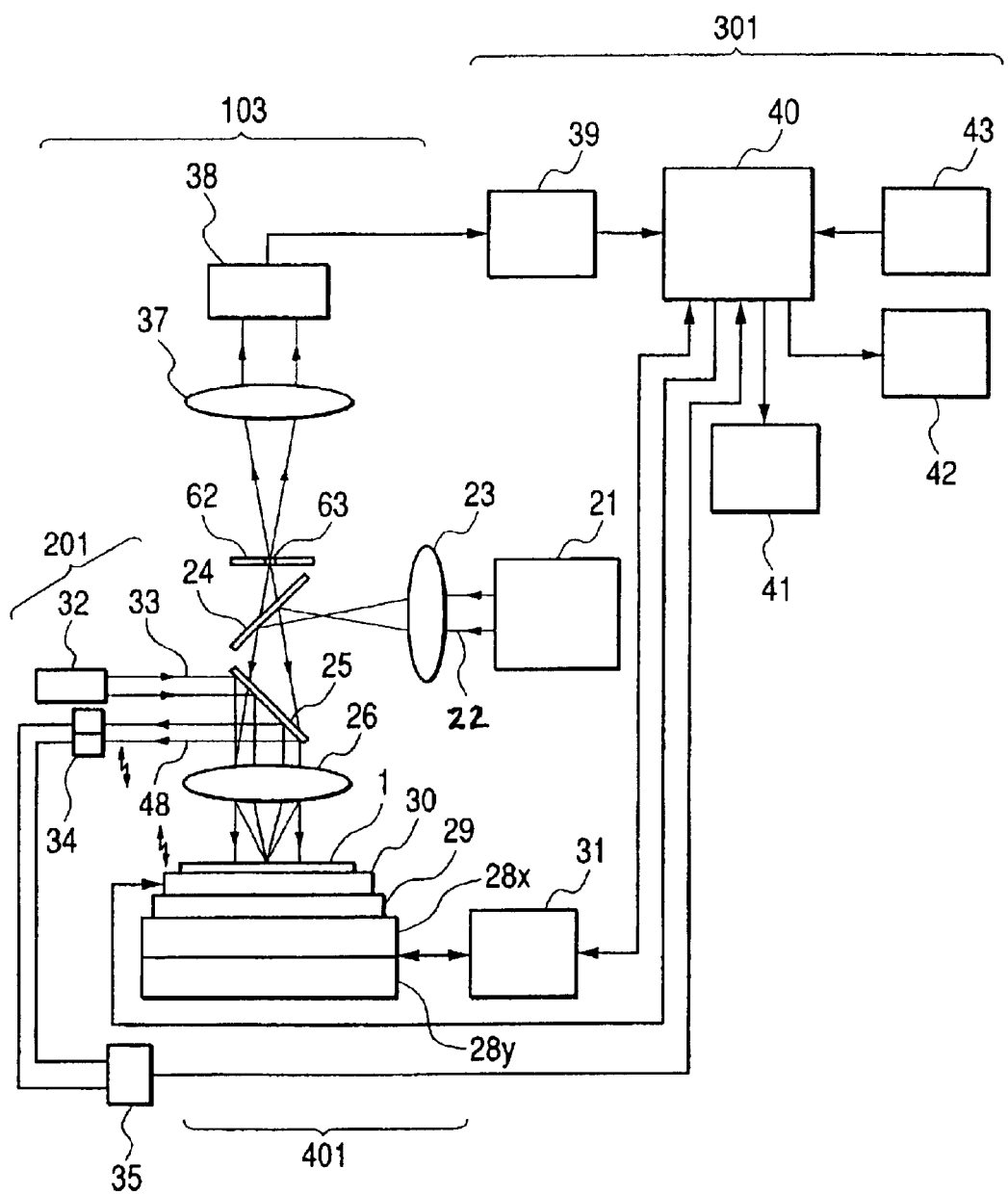
FIG. 13 is a schematic block diagram showing a constitution of a dimension/alignment measuring apparatus for MR and ELG according to a third embodiment of the present invention.

Next, a third embodiment according to the present invention will be described with reference to FIG. 13 to FIG. 15. FIG. 13 is a schematic block diagram showing a dimension/alignment measuring apparatus for MR and ELG according to the third embodiment of the present invention.

This apparatus is composed of a measurement optical system 103, a automatic focusing system 201, an image signal processing and controlling system 301, and a stage system 401. The main difference of the present embodiment from the first embodiment is that the measurement system 103 is constructed as a phase difference detection system by adding a phase modulation element 62 for detecting a phase difference in a detected light path. The constructions and features of other components, that is, the automatic focusing system 201, the image signal processing and controlling system 301, and the stage system 401 are the same as in the first embodiment, and, therefore, a description of these components will be omitted.

Details of the measurement optical system 103 are schematically shown in FIG. 14($a$). DUV light 64 having a wavelength of 248 nm emitted from the DUV light source 21 is collimated by the DUV matching relay lens 23 and the DUV matching objective lens 26 having a NA of 0.9 and made to epi-illuminate the element area on the wafer 1. The beam splitter 24 is used for separating the illumination light and the detected light. A phase modulation element 62 is disposed at a focal position of the objective lens 26 on the image side. As shown in FIG. 15, the phase modulation element 62 has an area for transmitting DUV light 68 and a quarter wavelength plate 63 in the central part thereof. Of the light reflected from the element area on the wafer 1, directly reflected light from the whole portion of the element area is focused on a focal point on the image side through the DUV matching objective lens 26 and is transformed into light 67 with a phase retarded by a quarter wavelength, because the directly reflected light passes through this quarter wavelength plate 63.

On the other hand, as seen in FIG. 14(b), diffracted light components 65a and 65b, which pass though the protection films 51a and 51b and then are diffracted by element stepped regions 3c and 3d, pass though the transmission area 68 of the phase modulation element 62. This transmitted light 66 interferes with the directly reflected light 67 from the whole portion of the element area with a phase retarded by a quarter wavelength, so that the contrast of a detected image of the element is enhanced through this interference effect. That is, the directly reflected light 67 from the whole portion of the element area, being used as reference light, is made to interfere with the diffracted light 65a and 65b from the element stepped region. An image of this interference light is picked up by a CCD solid image pickup element 38. Processing after the image pickup by the CCD solid image pickup element is identical to that described in the first embodiment.

According to the present embodiment, not only is it possible to attain the same effect as that of the first embodiment, but also a high-contrast image can be detected, and, thereby, high-precision measurement of the dimensions and alignment can be achieved because the phase difference at a minute step can be detected as a variation in strength of the interference light by the use of light interference even when there is a trend toward reduction in the thickness of the MR elements and the resistance detector elements, reaching a pattern step of the order of 10 nm. By the way, in the present embodiment, the scanning locus of the X stage 28x is persistently chosen to be a basis for measurement of element alignment. Alternatively, to further improve the accuracy of the measurement, it is also possible to monitor the displacement of the stage with a laser length measuring machine and to correct a reference position of detected images by that amount of displacement.

Figure 16:
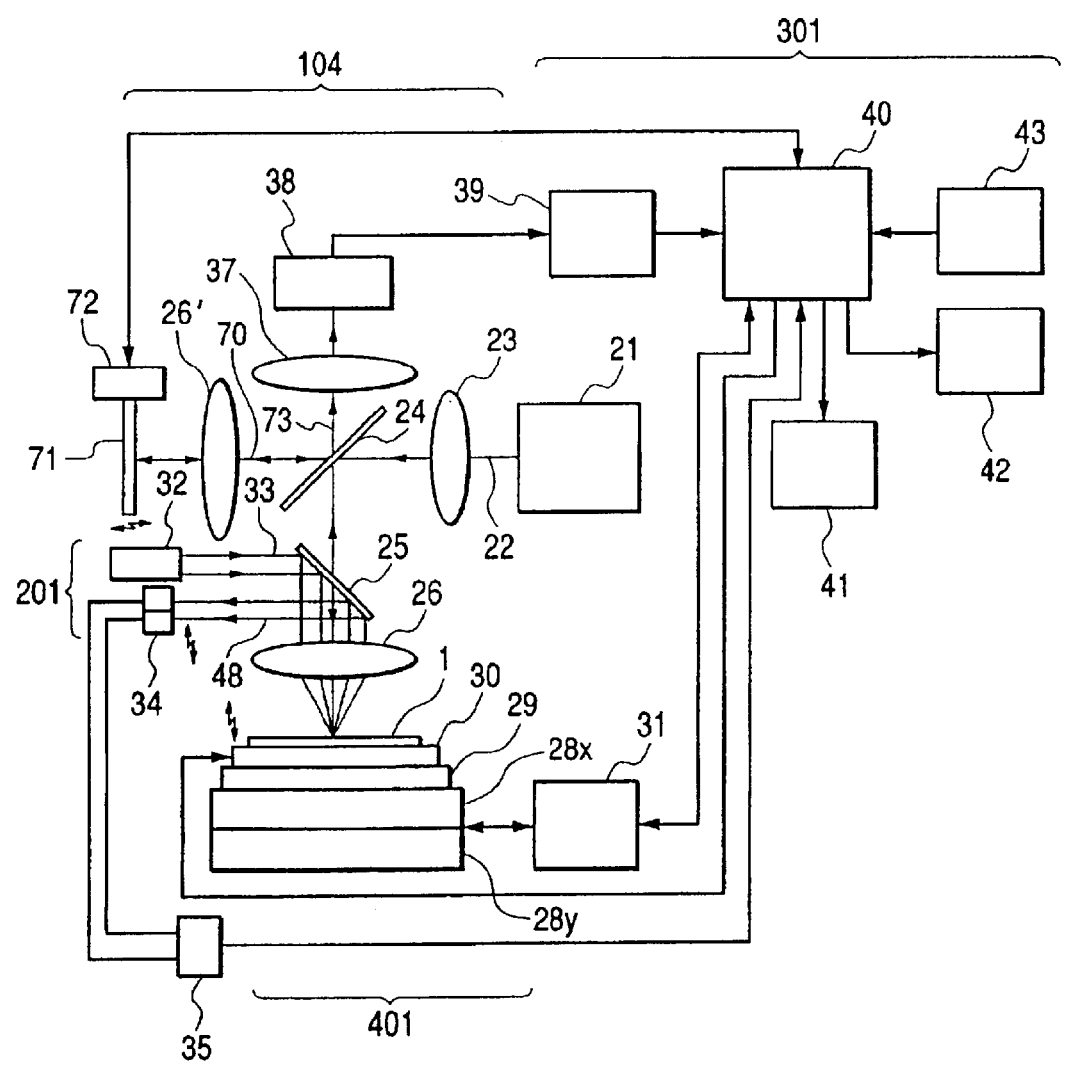
FIG. 16 is a schematic block diagram showing a dimension/alignment measuring apparatus for MR and ELG according to a fourth embodiment of the present invention.

Next, a fourth embodiment of the present invention will be described with reference to FIG. 16. FIG. 16 is a view showing a dimension/alignment measurement apparatus for MR and ELG according to the fourth embodiment of the present invention.

This apparatus is composed of a measurement optical system 104, an automatic focusing system 201, an image signal processing and controlling system 301, and a stage control system 401. The main difference of the present embodiment from the first embodiment is that the measurement optical system 104 is constructed so as to form a Twyman-Green interferometer. The construction and functions of other components, that is, the automatic focusing-system 201, the image signal processing and controlling system 301, and the stage control system 401, are much the same as in the first embodiment, and, therefore, a description of these components will be omitted.

DUV light 22 having a wavelength of 248 nm emitted from the DUV light source 21 is collimated by the DUV matching relay lens 23 and the DUV matching objective lens 26 having an NA of 0.9, which epi-illuminates the element area on the wafer 1. At the same time, the light 70 passing through the beam splitter 24 is collimated by the DUV matching lens 26' and is made to illuminate the reference mirror 71. The reflected light from the element area on the wafer 1 and the reflected light from the reference mirror 71 retrace identical light paths and are combined to interfere with each other. This interference light 73 is imaged onto a CCD solid pickup element 38 through the DUV imaging lens 37. The subsequent processing is the same as in the first embodiment.

Also, in the present embodiment, the phase difference generated at the element stepped region is transformed into a variation in the strength of the interference light, and, thereby, a high-contrast image can be detected as is the case of the third embodiment. The angle of elevation and the direction of the optical axis of the reference mirror 71 are fine-tuned by driving an actuator 72 in response to a signal from the computer 40 so as to optimize the interference effect, and, hence, to obtain a high-contrast interference image.

In the present embodiment, the DUV light source is chosen to be a combination of a mercury-xenon lamp and an interference filter having a transmission center wavelength of 248 nm. Alternatively, a fourth harmonic of a semiconductor laser-pumped YAG laser, namely 248 nm light, may be used. By the way, in the present embodiment, a scanning locus of the X stage 28x is persistently chosen to be a basis for measurement of element alignment. Alternatively, to further improve the accuracy of the measurement, it is also possible to monitor the displacement of the stage with a laser length measuring machine and to correct a reference position of detected images by that amount of displacement.

According to the present embodiment, not only is it possible to attain the same effect as the first embodiment can be attained, but also a high-contrast image can be detected, and, thereby, high-precision measurement of dimensions and alignment can be achieved because a phase difference at a minute step can be detected as a variation in the strength of the interference light by means of light interference, even when there is a steady trend toward reduction in the thickness of the MR element and the resistance detector element, reaching a pattern step in the order of 10 nm, as in the cases of the second and third embodiments.

Also, the DUV light is not required to be monochromatic light, but may be white light having a certain width of wavelengths instead. In such a case, sharp interference fringes can be obtained by adjusting the reference mirror 71 along the direction of the optical axis so that the optical path length from the beam splitter 24 to the wafer 1 and from the beam splitter 24 to the reference mirror 71 become identical with each other. By adjusting the Z-stage 30, sharp interference fringes of the pattern can be obtained both for a top part and for a bottom part. The step position in the pattern can be found from change points of the interference fringes.

Furthermore, in the four embodiments described above, the elements to be measured are all MR elements. However, elements to be measured according to the present inventions should not be limited to these elements; and, it goes without saying that the present invention also can be applicable to GMR (giant magneto-resistive) elements. Moreover, the present invention is not limited only to thin film-magnetic heads because of its fundamental configuration, but can be also applicable to measurement of dimensions and alignment of plural semiconductor element patterns, and also to measurement of the accuracy of superposition of patterns in exposing a substrate.

As described in the foregoing, according to the present invention, the following effects are obtained: (1) an effect that high-precision measurement of a minute MR element having a track width $W_t$ of 0.5 μm or less and a resistance detector element can be performed to determine their various dimensions and any alignment error even when end face protection films are provided; and (2) an effect that a situation in the element formation process can be in-process monitored. Also, an effect is achieved in that occurrence of defective elements can be reduced, and, hence, the yield can be improved through early detection of a process nonconformity and subsequent modification of process parameters which are realized by the above-described effects. Also, an effect is attained that a feedforward control lapping can be realized wherein a lapping weight is corrected based on measured data of dimensions and alignment in controlling the lapping weight in the lapping process.

What is claimed is:

1. A method of measuring dimensions and alignment error of thin film magnetic heads formed on a row bar cut-off from a substrate, comprising the steps of:

illuminating a magnetoresistance effect element and a resistance detector element which is formed for monitoring a lapping process, both of which are formed on the row bar, with illuminating light whose wavelength is 300 nm or less;

forming an image by imaging light reflected from said elements;

converting said image to an image signal through photoelectric conversion; and detecting dimensions of the magnetoresistance effect element and the resistance detector element formed on the row bar by processing said image signal, and calculating alignment error between the magnetoresistance effect element and the resistance detector element from detected dimensions.

2. A method according to claim 1, wherein the illuminating light includes a wavelength component of 248 nm.

3. A method according to claim 1, wherein the illuminating light includes a wavelength component of 266 nm.

4. A method according to claim 1, wherein the illuminating light includes a wavelength component of 213 nm.

5. A method according to claim 1, wherein the magnetoresistance effect element and the resistance detector element are covered with end face protection films.

6. A method according to claim 1, wherein the illuminating light has a wavelength of 200 nm.

7. A method according to claim 1, further comprising a step of displaying the measured results at least one of variations in dimensions of the elements or distribution of alignment error on a display.

8. An apparatus for measuring dimensions and alignment error of thin film magnetic heads formed on a row bar cut-off from a substrate, comprising:

a light source for emitting light whose wavelength is 300 nm or less;

illuminating means for illuminating a magnetoresistance effect element and a resistance detector element which is formed for monitoring a lapping process, both of which are formed on the row bar, with illuminating light emitted from said light source;

imaging means for obtaining an optical image of the row bar, illuminated by said illuminating means;

image pick up means for converting said optical image of the row bar, which is imaged by said imaging means, to an image signal through photoelectric conversion; and means for detecting dimensions and alignment error of said magnetoresistance effect element and said resistance detector element formed on the row bar by processing said image signal obtained by said image pick up means, and for calculating alignment error between said magnetoresistance effect element and said resistance detector element from detected dimensions.

9. An apparatus according to claim 8, wherein said light source emits light having a wavelength of 248 nm.

10. An apparatus according to claim 8, wherein said light source emits light having a wavelength of 266 nm.

11. An apparatus according to claim 8, wherein said light source emits light having a wavelength of 213 nm.

12. An apparatus according to claim 8, further compromising a display for displaying the measured results at least one of variations in dimensions of the elements or distribution of alignment error.

* * * * *